(12) United States Patent
Silverstein et al.

(10) Patent No.: US 6,844,971 B2
(45) Date of Patent: *Jan. 18, 2005

(54) DOUBLE SIDED WIRE GRID POLARIZER

(75) Inventors: Barry D. Silverstein, Rochester, NY (US); Andrew F. Kurtz, Rochester, NY (US); Xiang-Dong Mi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/732,069

(22) Filed: Dec. 10, 2003

(65) Prior Publication Data
US 2004/0120041 A1 Jun. 24, 2004

Related U.S. Application Data

(63) Continuation of application No. 09/977,544, filed on Oct. 15, 2001, now Pat. No. 6,714,350.

(51) Int. Cl.[7] .................................................. G02B 5/30
(52) U.S. Cl. ........................ 359/486; 359/483; 359/900
(58) Field of Search ................................ 359/483, 485, 359/486, 900; 349/9; 353/20

(56) References Cited

U.S. PATENT DOCUMENTS

| 2,224,214 A | 12/1940 | Brown |
| 2,287,598 A | 6/1942 | Brown |
| 2,403,731 A | 7/1946 | MacNeille |
| 3,046,839 A | 7/1962 | Bird et al. |
| 3,235,630 A | 2/1966 | Doherty et al. |
| 3,291,550 A | 12/1966 | Bird et al. |
| 3,479,168 A | 11/1969 | Bird et al. |
| 3,536,373 A | 10/1970 | Bird et al. |
| 3,969,545 A | 7/1976 | Slocum |
| 4,049,944 A | 9/1977 | Garvin et al. |
| 4,221,464 A | 9/1980 | Pedinoff et al. |
| 4,289,381 A | 9/1981 | Garvin et al. |
| 4,456,515 A | 6/1984 | Krueger et al. |
| 4,512,638 A | 4/1985 | Sriram et al. |
| 4,514,479 A | 4/1985 | Ferrante |
| 4,743,092 A | 5/1988 | Pistor |
| 4,946,231 A | 8/1990 | Pistor |
| 5,122,907 A | 6/1992 | Slocum |
| 5,177,635 A | 1/1993 | Keilmann |
| 5,383,053 A | 1/1995 | Hegg et al. |
| 5,748,368 A | 5/1998 | Tamada et al. |
| 5,991,075 A | 11/1999 | Katsuragawa et al. |
| 6,081,376 A | 6/2000 | Hansen et al. |
| 6,108,131 A | 8/2000 | Hansen et al. |
| 6,122,103 A | 9/2000 | Perkins et al. |
| 6,208,463 B1 | 3/2001 | Hansen et al. |
| 6,234,634 B1 | 5/2001 | Hansen et al. |
| 6,243,199 B1 | 6/2001 | Hansen et al. |
| 6,288,840 B1 | 9/2001 | Perkins et al. |
| 6,447,120 B1 | 9/2002 | Hansen et al. |
| 6,511,183 B2 | 1/2003 | Shimizu et al. |
| 6,532,111 B2 | 3/2003 | Kurtz et al. |
| 6,585,378 B2 | 7/2003 | Kurtz et al. |
| 6,714,350 B2 * | 3/2004 | Silverstein et al. ......... 359/486 |

* cited by examiner

*Primary Examiner*—Audrey Chang
*Assistant Examiner*—Craig Curtis
(74) *Attorney, Agent, or Firm*—Nelson Adrian Blish

(57) ABSTRACT

A wire grid polarizer (100) for polarizing an incident light beam (130), comprising a substrate (505) having a first surface (410) and a second surface (510); and a first array of parallel, elongated wires disposed on the first surface (410). Each of the wires are spaced apart at a grid period less than a wavelength of the incident light; and a second array of parallel, elongated wires disposed on said second surface (420) where the second array of wires are oriented parallel to the first array of wires.

13 Claims, 9 Drawing Sheets

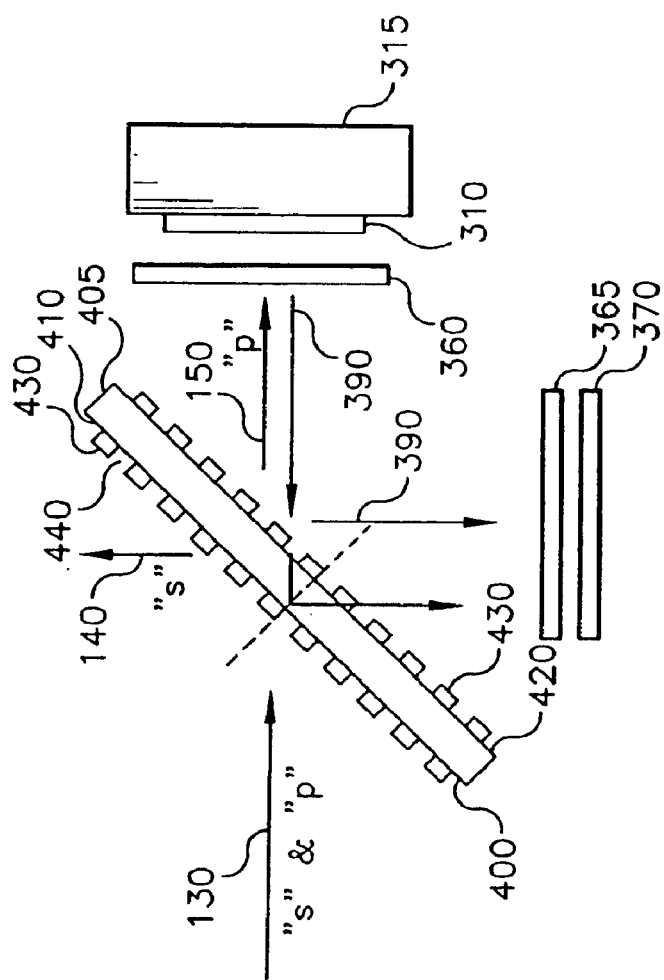
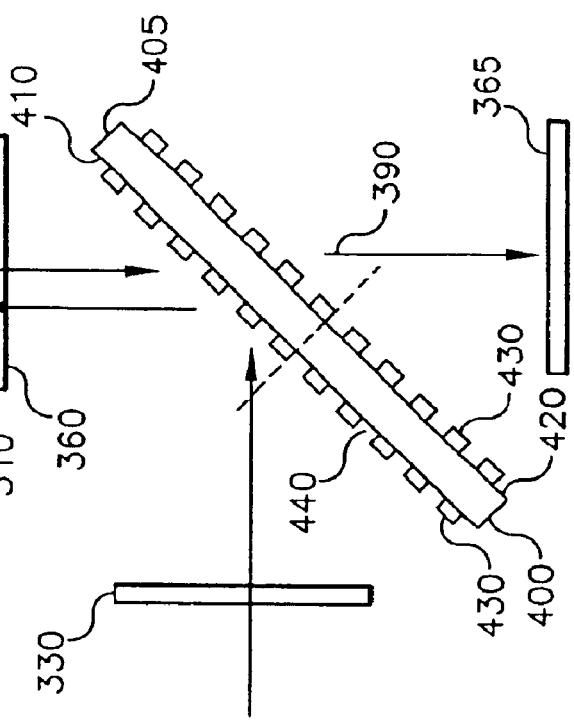
FIG. 6a
FIG. 6b

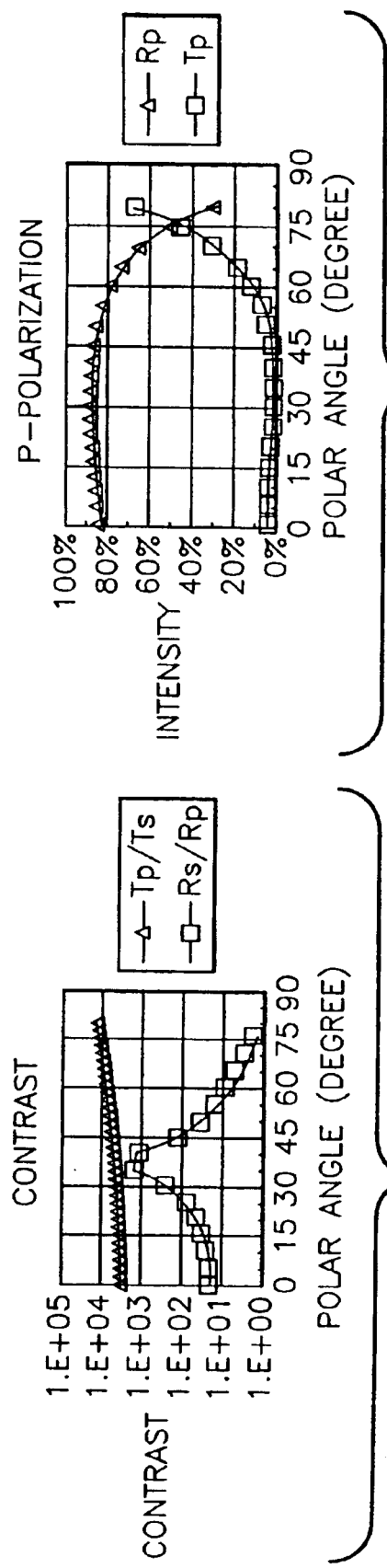
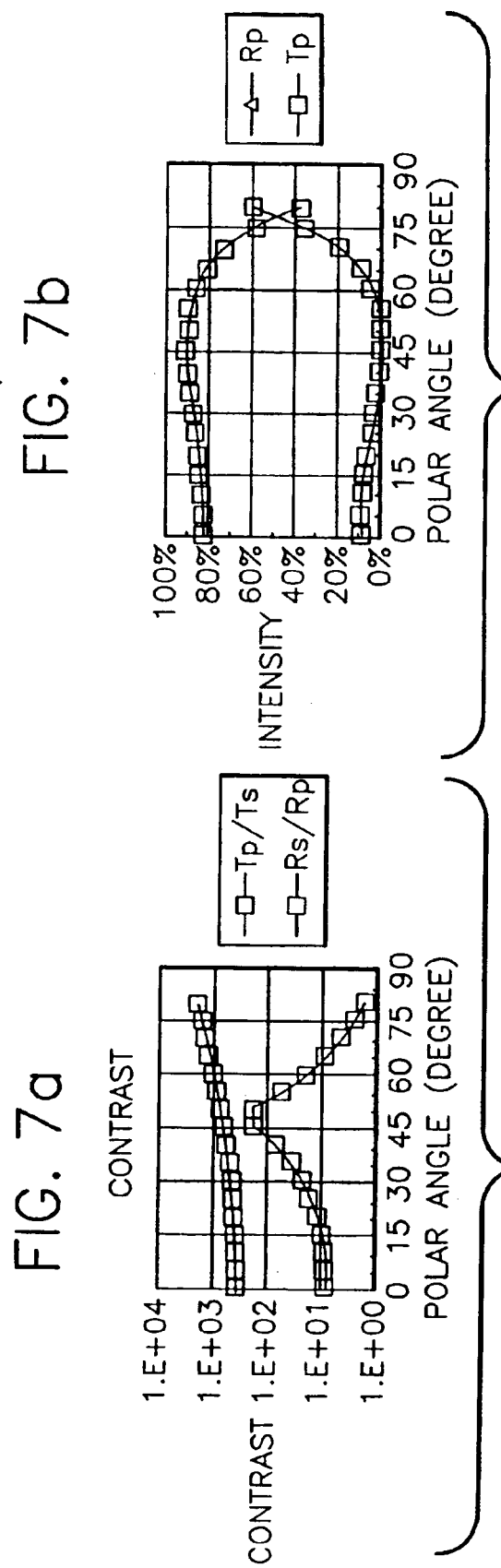
FIG. 7b
FIG. 7d
FIG. 7a
FIG. 7c

DOUBLE SIDED WIRE GRID POLARIZER

CROSS REFERENCE TO RELATED APPLICATIONS

This is a continuation of application Ser. No. 09/977,544, filed Oct. 15, 2001, now U.S. Pat. No. 6,714,350.

FIELD OF THE INVENTION

The present invention generally relates to wire grid polarizers and their use in a modulation optical system. The present invention relates in particular to double sided wire grid polarizers and beamsplitters for the visible spectrum, and the use of these double sided wire grid polarizers within a modulation optical system.

BACKGROUND OF THE INVENTION

The use of an array of parallel conducting wires to polarize radio waves dates back more than 110 years. Wire grids, generally in the form of an array of thin parallel conductors supported by a transparent substrate, have also been used as polarizers for the infrared portion of the electromagnetic spectrum.

The key factor that determines the performance of a wire grid polarizer is the relationship between the center-to-center spacing, sometimes referred to as period or pitch, of the parallel grid elements and the wavelength of the incident light. If the grid spacing or period is long compared to the wavelength, the grid functions as a diffraction grating, rather than as a polarizer, and diffracts both polarizations, not necessarily with equal efficiency, according to well-known principles. However, when the grid spacing (p) is much shorter than the wavelength, the grid functions as a polarizer that reflects electromagnetic radiation polarized parallel ("s" polarization) to the grid, and transmits radiation of the orthogonal polarization ("p" polarization). The transition region, where the grid period is in the range of roughly one-half of the wavelength to twice the wavelength, is characterized by abrupt changes in the transmission and reflection characteristics of the grid. In particular, an abrupt increase in reflectivity, and corresponding decrease in transmission, for light polarized orthogonal to the grid elements will occur at one or more specific wavelengths at any given angle of incidence. These effects were first reported by Wood in 1902, and are often referred to as "Wood's Anomalies." Subsequently, in 1907, Rayleigh analyzed Wood's data and had the insight that the anomalies occur at combinations of wavelength and angle where a higher diffraction order emerges. Rayleigh developed following equation to predict the location of the anomalies, which are also commonly referred to in the literature as "Rayleigh Resonances."

$$\lambda = \epsilon(n +/- \sin\theta)/k \quad (1)$$

wherein epsilon ($\epsilon$) is the grating period; n is the refractive index of the medium surrounding the grating; k is an integer corresponding to the order of the diffracted term that is emerging; and lambda and theta are the wavelength and incidence angel (both measured in air) where the resonance occurs.

For gratings formed on one side of a dielectric substrate, n in the above equation may be equal to either 1, or to the refractive index of the substrate material. Note that the longest wavelength at which a resonance occurs is given by the following formula:

$$\lambda = \epsilon(n + \sin\theta) \quad (2)$$

where n is set to be the refractive index of the substrate.

The effect of the angular dependence is to shift the transmission region to larger wavelengths as the angle increases. This is important when the polarizer is intended for use as a polarizing beamsplitter or polarizing turning mirror.

In general, a wire grid polarizer will reflect light with its electric field vector parallel ("s" polarization) to the wires of the grid, and transmit light with its electric field vector perpendicular ("p" polarization) to the wires of the grid, but the plane of incidence may or may not be perpendicular to the wires of the grid as discussed here. Ideally, the wire grid polarizer will function as a perfect mirror for one polarization of light, such as the S polarized light, and will be perfectly transparent for the other polarization, such as the P polarized light. In practice, however, even the most reflective metals used as mirrors absorb some fraction of the incident light and reflect only 90% to 95%, and plain glass does not transmit 100% of the incident light due to surface reflections. The performance of wire grid polarizers, and indeed other polarization devices, is mostly characterized by the contrast ratio, or extinction ratio, as measured over the range of wavelengths and incidence angles of interest. For a wire grid polarizer or polarization beamsplitter, the contrast ratios for the transmitted beam (Tp/Ts) and the reflected beam (Rs/Rp) may both be of interest.

Historically, wire grid polarizers were developed for use in the infrared, but were unavailable for visible wavelengths. Primarily, this is because processing technologies were incapable of producing small enough sub-wavelength structures for effective operation in the visible spectrum. Nominally, the grid spacing or pitch (p) should be less than $\sim\lambda/5$ for effective operation (for $p \sim 0.10-0.13\ \mu m$ for visible wavelengths), while even finer pitch structures ($p \sim \lambda/10$ for example) can provide further improvements to device contrast. However, with recent advances in processing technologies, including 0.13 $\mu m$ extreme UV photolithography and interference lithography, visible wavelength wire grid structures have become feasible. Although there are several examples of visible wavelength wire grid polarizers devices known in the art, these devices do not provide the very high extinction ratios (>1,000:1) across broadband visible spectra needed for demanding applications, such as for digital cinema projection.

An interesting wire grid polarizer is described by Garvin et al. in U.S. Pat. No. 4,289,381, in which two or more wire grids residing on one side of a single substrate are separated by a thin dielectric interlayer. Each of the wire grids are deposited separately, and the wires are thick enough (100–1000 nm) to function as a polarizer without significant light leakage through the metal wires. As the dielectric interlayer is thick enough to avoid resonance, the wire grids effectively multiply, such that while any single wire grid may only provide 500:1 polarization contrast, in combination a pair or grids may theoretically provide 250,000:1. This device is described relative to usage in the infrared spectrum (2–100 $\mu m$), although presumably the concepts are extendable to visible wavelengths. However, as this device employs two or more wire grids in a series, the additional contrast ratio is exchanged for reduced transmission efficiency and angular acceptance. Furthermore, the device is not designed for high quality extinction for the reflected beam, which places some limits on its value as a polarization beamsplitter.

A wire grid polarization beamsplitter for the visible wavelength range is described by Hegg et al. in U.S. Pat. No. 5,383,053, in which the metal wires (with pitch $p<<\lambda$ and ~150 nm features) are deposited on top of metal grid lines, each of which are deposited onto glass or plastic substrate. While this device is designed to cover much of the visible spectrum (0.45–0.65 $\mu$m), the anticipated polarization performance is rather modest, delivering an overall contrast ratio of only 6.3:1.

Tamada et al., in U.S. Pat. No. 5,748,368, describes a wire grid polarizer for the near infrared spectrum (0.8–0.95 $\mu$m) in which the structure of the wires is shaped in order to enhance performance. In this case, operation in the near infrared spectrum is achieved with a wire structure with a long grid spacing ($\lambda/2<p<\lambda$) rather than the nominal small grid spacing ($p\sim\lambda/5$) by exploiting one of the resonances in the transition region between the wire grid polarizer and the diffraction grating. The wires, each ~140 nm thick, are deposited on a glass substrate in an assembly with wedge plates. In particular, the device uses a combination of trapezoidal wire shaping, index matching between the substrate and a wedge plate, and incidence angle adjustment to tune the device operation to hit a resonance band. While this device provides reasonable extinction of ~35:1, which would be useful for many applications, this contrast is inadequate for applications, such as digital cinema, which require higher performance. Furthermore, this device only operates properly within narrow wavelength bands (~25 nm) and the device is rather angularly sensitive (a 2° shift in incidence angle shifts the resonance band by ~30 nm). These considerations also make the device unsuitable for broadband wavelength applications in which the wire grid device must operate in "fast" optical system (such as F/2.5).

Most recently, U.S. Pat. No. 6,108,131 (Hansen et al.), U.S. Pat. No. 6,122,103 (Perkins et al.) and U.S. Pat. No. 6,243,199 (Hansen et al.), all assigned to Moxtek Inc., or Orem, Utah, describe wire grid polarizer devices designed for the visible spectrum. U.S. Pat. No. 6,108,131 describes a straightforward wire grid polarizer designed to operate in the visible region of the spectrum. The wire grid nominally consists of a series of individual wires fabricated directly on a substrate with a ~0.13 $\mu$m gridline spacing ($p\sim\lambda/5$), wire nominal width of 0.052–0.078 $\mu$m wide (w), and wire thickness (t) greater than 0.02 $\mu$m. By using wires of ~0.13 $\mu$m grid spacing or pitch, this device has the required sub-visible wavelength structure to allow it to generally operate above the long wavelength resonance band and in the wire grid region. U.S. Pat. No. 6,122,103 proposes a variety of improvements to the basic wire grid structure directed to broadening the wavelength spectrum and improving the efficiency and contrast across the wavelength spectrum of use without requiring finer pitch structures (such as ~$\lambda/10$). Basically, a variety of techniques are employed to reduce the effective refractive index (n) in the medium surrounding the wire grid, in order to shift the longest wavelength resonance band to shorter wavelengths (see equations (1) and (2)). This is accomplished most simply by coating the glass substrate with a dielectric layer which functions as an anti-reflectional (AR) coating, and then fabricating the wire grid onto this intermediate dielectric layer. The intermediate dielectric layer effectively reduces the refractive index experienced by the light at the wire grid, thereby shifting the longest wavelength resonance shorter. U.S. Pat. No. 6,122,103 also describes alternate designs where the effective index is reduced by forming grooves in the spaces between the wires, such that the grooves extend into the substrate itself, and/or into the intermediate dielectric layer which is deposited on the substrate. As a result of these design improvements, the low wavelength band edge shifts ~50–75 nm lower, allowing coverage of the entire visible spectrum. Furthermore, the average efficiency is improved by ~5% across the visible spectrum over the basic prior art wire grid polarizer. By comparison, U.S. Pat. No. 6,243,199 patent describes how to optimize wire pitch (p), wire thickness(t), wire width (w), and wire profile in order to control throughput and contrast for visible wire grid polarizers.

Although these new visible spectrum wire grid polarizers and polarization beam splitters provide enhanced contrast compared to the standard technologies (for example the MacNielle prism, U.S. Pat. No. 2,403,731), some applications require complex polarization optics arrangements to obtain the desired contrast levels, which can utilize more than one wire grid device. For example, to attain the $1,000:1^+$ system contrast required of a digital cinema projection system, a modulation optical system that includes two wire grid polarizers and one wire grid polarization beam splitter may be utilized. An electronic projection system of this type may use high modulation contrast liquid crystal displays (LCDs) and high power (up to 6 kW) xenon arc lamps to deliver 1,000:1 system CR and 10,000 screen lumens. The design of such a system is complicated by the effects of thermal loading on the optical components, mechanical fixtures, and electrical circuitry. In particular, thermal loading of the polarization optics (LCDs, polarizers and the polarization beam splitter) can cause stress birefringence, thereby reducing the screen contrast. Furthermore, thermal loading of the polarization beam splitter, and in particular a sheet polarizing beam splitter (such as a wire grid device) can cause surface profile deformations which could effect the wavefront quality of the image bearing light beam. This can in turn translate into a degradation of the screen resolution of the projected image.

Therefore it is desirable to provide enhanced wire grid polarization beam splitters which have reduced sensitivity to thermal stress, and which can therefore improve the optical performance of the modulation optical system in which they reside.

Furthermore, it is desirable to provide an enhanced wire grid polarization beam splitter which provides enhanced polarization performance over those devices known in the prior art. In particular, while the devices described in U.S. Pat. Nos. 6,108,131, 6,122,103 and 6,243,199 are definite improvements over the prior art, there are yet further opportunities for performance improvements for both wire grid polarizers and polarization beamsplitters. For example, in electronic projection systems utilizing reflective LCD modulators, the image bearing light interacts with the PBS both in reflection and transmission. Thus, having high polarization extinction for both the reflected and transmitted beams is valuable. As the commercially available wire grid polarizers from Moxtek provide only ~20:1 contrast for the reflected channel, rather than 100:1 or even 2,000:1, the design of optical systems using these devices must be configured, with some difficulty, to compensate for the low reflective contrast. Additionally, the performance of these devices varies considerably across the visible spectrum, with the polarization beamsplitter providing contrast ratios for the transmitted beam varying from ~300:1 to ~1200:1 from blue to red, while the reflected beam contrast ratios vary from 10:1 to 30:1. Thus, there are opportunities to provide polarization contrast performance in the blue portion of the visible spectrum in particular, as well as more uniform extinction across the visible. There are also opportunities to improve the combined polarization contrast and light efficiency for the transmitted p-polarization light beyond the levels provided by prior art wire grid devices.

Thus, there exists a need for an improved wire grid polarization beamsplitter, particularly for use in visible light systems requiring broad wavelength bandwidth and high contrast (target of 1,000:1 or greater). In addition, there exists a need for such an improved wire grid polarization beam splitter for use at incidence angles of about 45 degrees.

SUMMARY OF THE INVENTION

A wire grid polarizer for polarizing an incident light beam, comprising a substrate having a first surface and a second surface, and a first array of parallel, elongated conducting wires disposed on said first surface. Each of the wires are spaced apart at a grid period less than a wavelength of the incident light. A second array of parallel, elongated conducting wires disposed on the second surface where the second array of wires are oriented parallel to the first array of wires. The wires of the second array are likewise spaced apart at a grid period less than a wavelength of the incident light.

BRIEF DESCRIPTION OF THE DRAWINGS

FIGS. 6a and 6b are cross sectional views showing modulation optical systems utilizing the double sided wire grid polarization beamsplitter of the present invention.

FIGS. 7a–7g are graphic plots showing wire grid performance characteristics of related to design of a double sided wire grid polarizer of the present invention.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1:
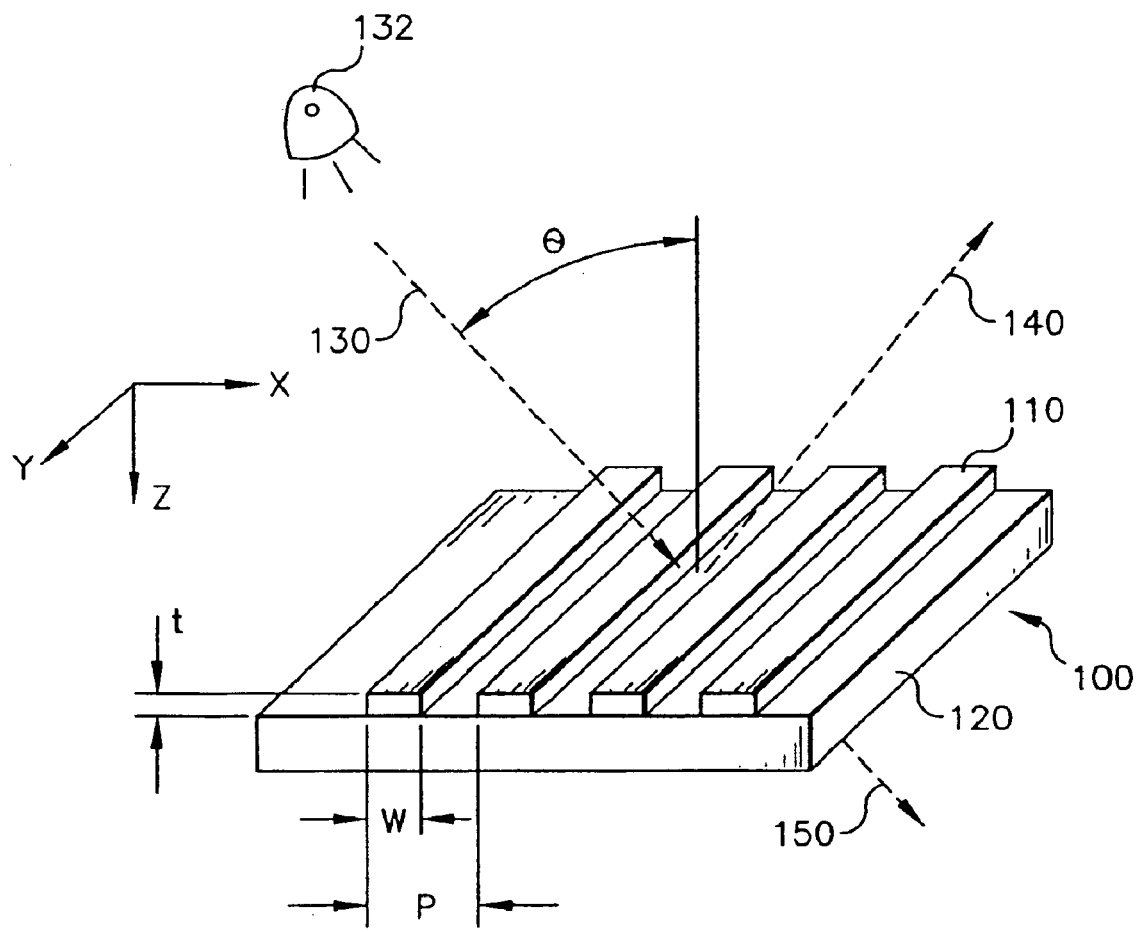
FIG. 1 is a perspective view of a prior art wire grid polarizer.

FIG. 1 illustrates a basic prior art wire grid polarizer and defines terms that will be used in a series of illustrative examples of the prior art and the present invention. The wire grid polarizer 100 is comprised of a multiplicity of parallel conductive electrodes 110 supported by a dielectric substrate 120. This device is characterized by the grating spacing or pitch or period of the conductors, designated (p); the width of the individual conductors, designated (w); the duty cycle (w/p) and the thickness of the conductors, designated (t). Nominally, a wire grid polarizer uses sub-wavelength structures, such that the pitch (p), conductor or wire width (w), and the conductor or wire thickness (t) are all less than the wavelength of incident light ($\lambda$). As the conductive electrodes are required to be highly electrically conductive, these wires are nominally metallic, and are for example, made of aluminum. A beam of light 130 produced by a light source 132 is incident on the polarizer at an angle $\theta$ from normal, with the plane of incidence orthogonal to the conductive elements. The wire grid polarizer 100 divides this beam into specular non-diffracted outgoing light beams; reflected light beam 140 and transmitted light beam 150. The definitions for S and P polarization used are that S polarized light is light with its polarization vector parallel to the conductive elements, while P polarized light has its polarization vector orthogonal to the conductive elements.

Figure 2A:
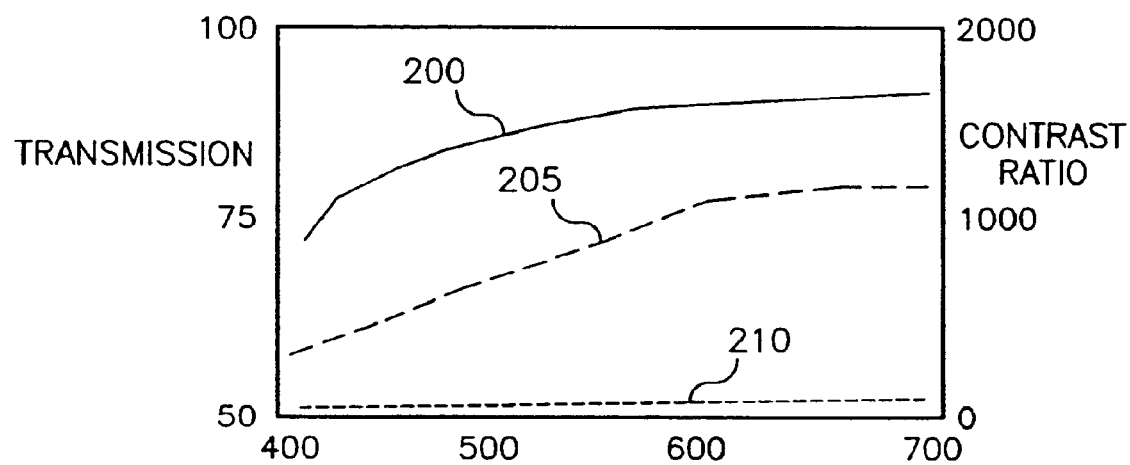
FIGS. 2a and 2b are plots illustrating the relative performance or prior art wire grid polarizers and polarization beamsplitters designed to operate within the visible spectrum.

Referring to FIG. 2a there is shown, for wavelengths within the visible spectrum, the transmission efficiency curve 200 and the transmitted "p" polarization contrast ratio curve 205 for a commercially available wire grid polarization beamsplitter from Moxtek Inc., of Orem, Utah. This device is similar to the basic wire grid polarization beamsplitter described in U.S. Pat. No. 6,108,131, which has ~130 nm pitch (p~$\lambda$/5) aluminum wires (parallel conductive electrodes 110) made with a 40–60% duty cycle (52–78 nm wire width (w)) deposited on a dielectric substrate 120. The solid metal wires are nominally 100–150 nm thick, which provides sufficient metal thickness to exceed the skin depth ($\delta$) of the metal layer in the visible spectrum, thereby enhancing the device contrast. (Skin depth is an estimate of the metal layer thickness at which light tunneling through the layer is minimal.) This data is representative for this device for a modest NA (numerical aperture) light beam, incident on the wire grid polarization beam splitter 100 at an angle of incidence ($\theta$) of 45°. As this device divides the incident beam of light 130 into two outgoing polarized beams (140 and 150), that travel paths spatially distinguishable from the incoming light path, this device is considered to be a polarizing beamsplitter. The transmitted contrast ratio curve 205 measures the average contrast of the transmitted "p" polarized light, relative to the transmitted "s" polarized light (Tp/Ts), where the "s" polarized light is undesirable leakage. Likewise, the reflected contrast ratio curve 210 measures the average contrast of the reflected "s" polarized light relative to the "p" polarized light (Rs/Rp). As measured across the visible spectrum from blue to red, the transmitted contrast ranges from ~300–1200:1 while the reflected contrast ranges from ~10–40:1.

Figure 2B:
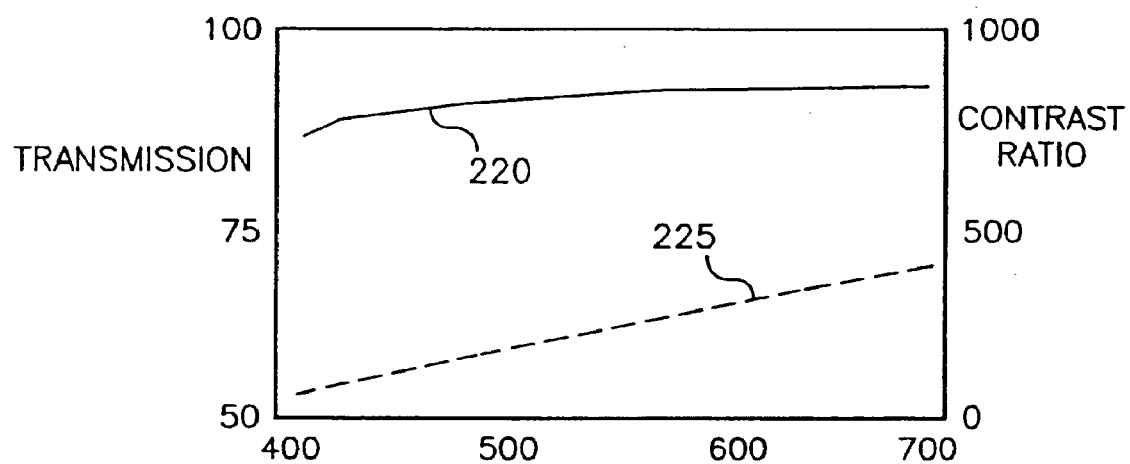

Referring to FIG. 2b, there is shown for wavelengths within the visible spectrum, the average performance for a commercially available wire grid polarizer from Moxtek which is designed for use with normally incident ($\theta$=0°) beam of light 130. In particular, the transmission efficiency curve 220 and the transmitted contrast ratio curve 225, are provided (for "p" polarized light). In this case, the measured transmitted contrast exceeds 200:1 for much of the green and red spectra. The performance of both of these devices, relative to contrast, wavelength response, angular response, transmission, and robustness is very good as compared to the historically available alternatives, and is satisfactory for many applications. It should be noted that the wire grid designs for the wire grid polarizer (used at normal incidence) and the wire grid polarization beam splitter (used at non-normal incidence) may be different and optimized for their intended uses.

Figure 4:
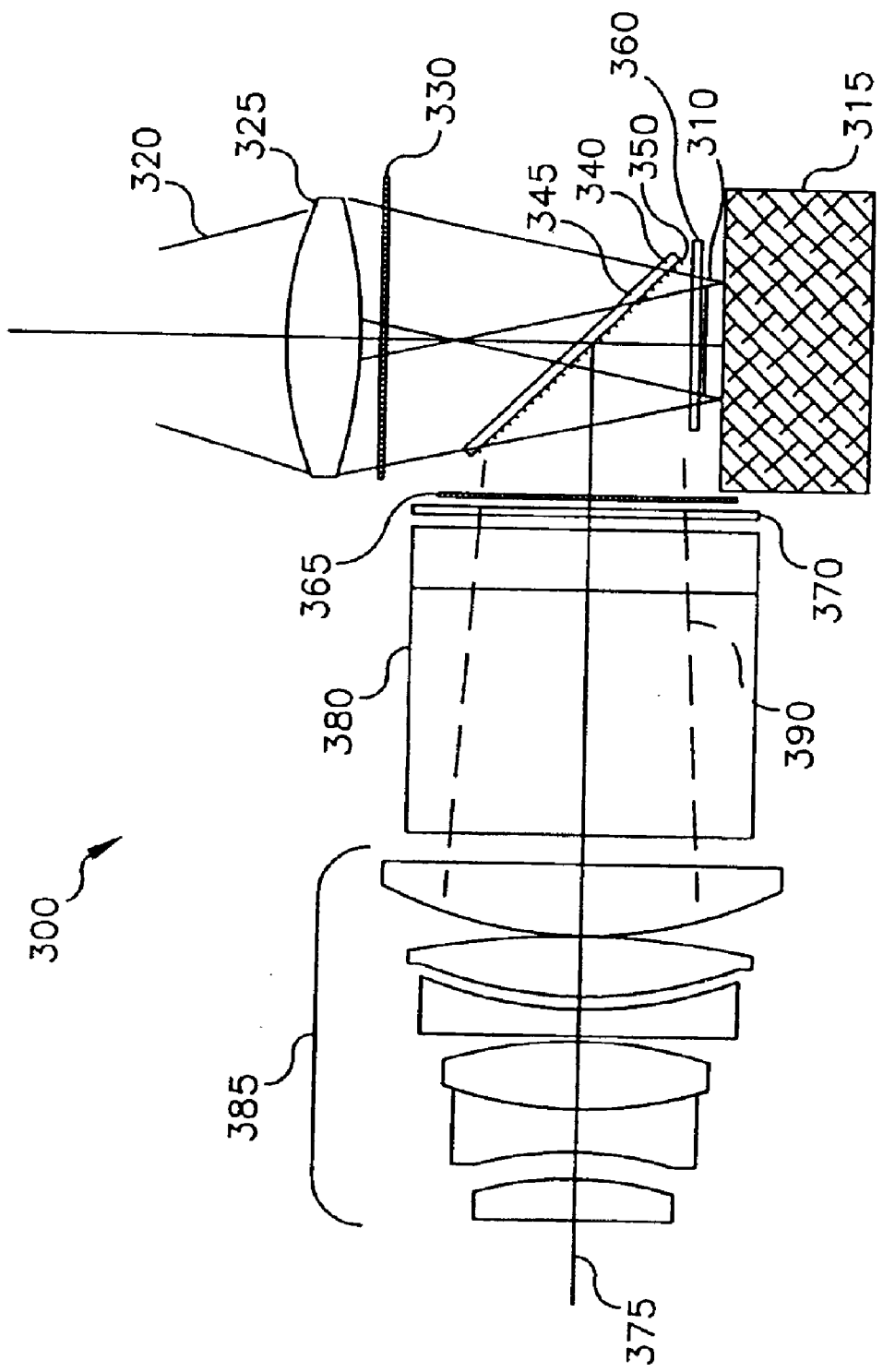
FIG. 4 is a cross sectional view showing a modulation optical system which includes a wire grid polarization beamsplitter.

The preferred spatial relationships of these polarizers, as used in a modulation optical system 300, are illustrated in FIG. 4. Modulation optical system 300, which is a portion of an electronic projection system, comprises an incoming illumination light beam 320, focused through prepolarizer 330, wire grid polarization beamsplitter 340, optional compensator 360, and onto spatial light modulator 310 (the LCD) by a condensor 325. A modulated, image-bearing light beam is reflected from the surface of spatial light modulator 310, transmitted through compensator 360, reflected off the near surface of wire grid polarization beamsplitter 340, and subsequently transmitted through a second compensator 365 (optional), a polarization analyzer 370, and recombination prism 380. Recombination prism 380 is typically an x-prism, although crossed dichroic plates could be used (aside from the resulting tilted plate optical aberrations). The modulation contrast provided by this system is not only impacted by the performance of the individual polarization components (spatial light modulator 310, prepolarizer 330, wire grid polarization beamsplitter 340, compensator 360, and polarization analyzer 370), but also by performance variability within these components caused by thermal stress induced birefringence changes under high heat (light) loads. Likewise, thermal loading can cause surface deformations of these various optics, thereby deforming the wavefronts of the transiting image bearing light, and thus affecting the projected on screen image quality (resolution). It is however possible to provide an enhanced wire grid polarization beam splitter 340, which will be desensitized to thermally induced changes and also provide optimized performance (relative to contrast and light efficiency), thereby improving the overall performance of modulation optical system 300.

These opportunities can be better understood by first explaining the performance deficiencies of the existing wire grid devices (see FIG. 2a for the wire grid polarization beamsplitter and FIG. 2b for the wire grid polarizer). In particular, the contrast ratio of the reflected "s" polarized beam is rather low, as measured by the reflected contrast ratio curve 210, for the wire grid polarizing beamsplitter. Polarization contrast is only ~10:1 in the blue spectrum (at 450 nm), and even in the red (650 nm), it has risen only to ~40:1. In the case of modulation optical system 300 of FIG. 4 applications, where the contrast is determined by both reflective and transmissive interactions with the wire grid polarization beam splitter 340, this performance is insufficient by itself. Additionally, while this prior art wire grid polarization beamsplitter provides contrast ~1200:1 in the red, the polarization varies considerably with wavelength, and falls to ~400:1 in the low blue (see again transmitted contrast ratio curve 205 of FIG. 2a).

This assessment of the performance of a prior art wire grid polarization beamsplitter (as described in U.S. Pat. No. 6,108,131) is better understood by considering the theoretically calculated reflected and transmitted polarization contrast ratios. This analysis was modeled using the Gsolver grating analysis software tool, which allows sub-wavelength structures to be thoroughly modeled using rigorous coupled wave analysis (RCWA). Gsolver is commercially available from Grating Solver Development Company, P.O. Box 353, Allen, Tex.

The wire grid device was modeled as a series of parallel elongated wires formed directly on the transparent glass substrate. The analysis assumes an aluminum wire grid with period p=0.13 $\mu$m, conductor width w=0.052 $\mu$m (40% duty cycle), conductor thickness t=0.182 $\mu$m, and substrate refractive index (n) for Corning 1737f glass. The data used in the modeling for the optical properties of the metals can be taken from the *Handbook of Optical Constants of Solids, Part I*, Edward D. Palik, Ed., 1985, pp. 369–406, for example. For simplicity, this analysis only considers a collimated beam incident on the wire grid polarization beamsplitter at an angle $\theta=45°$.

Figure 3A:
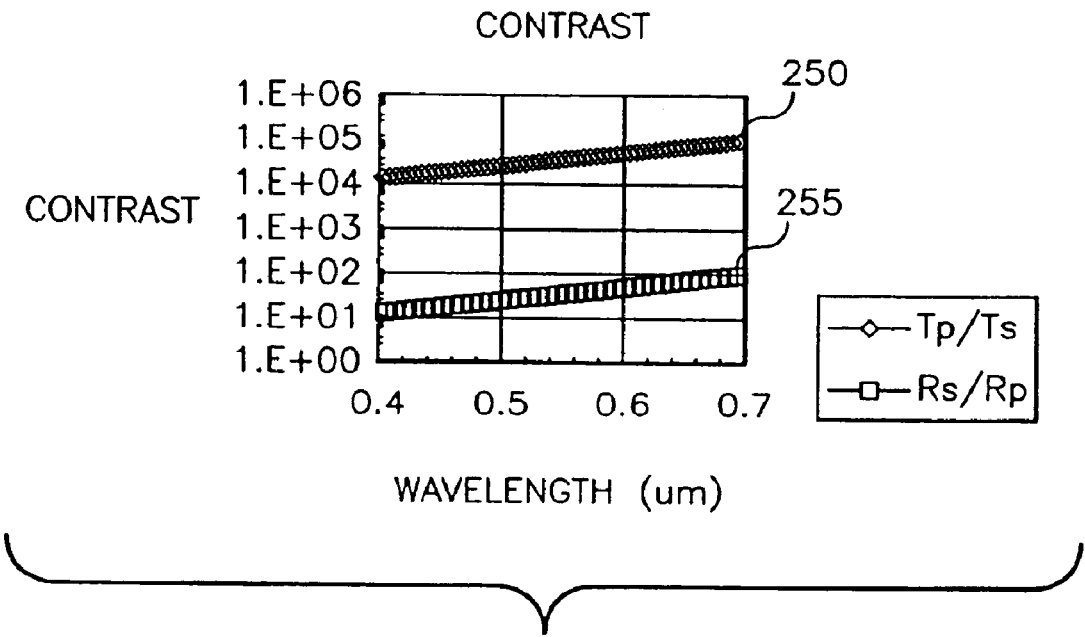
FIGS. 3a and 3b are plots of transmitted, reflected, and overall polarization contrast ratios vs. wavelength in the visible spectrum for a wire grid polarization beamsplitter of a type described in the prior art.
Figure 3B:
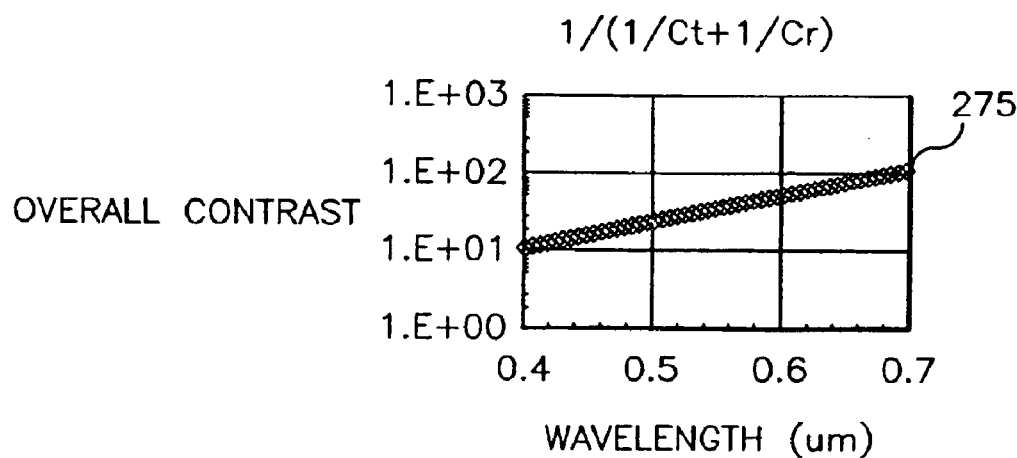

FIG. 3a provides the collimated transmitted beam contrast 250 (Tp/Ts) and the collimated reflected beam contrast 255 (Rs/Rp). The calculated transmitted beam contrast 250 ranges from $10^4$–$10^5$:1 across the visible spectrum, which is much greater than the ~1,000:1 levels reported for the actual device, as shown in FIG. 2a. However, plot 250 of FIG. 2a represents the angle averaged performance of an actual device, while plot 250 of FIG. 3a represents the theoretical performance of a collimated beam through a perfect device with slightly thicker wires. FIG. 3a also shows the theoretical reflected beam contrast 255 as modeled for this prior art type wire grid devices. The calculated theoretical reflected beam contrast ranges from ~10:1 to ~100:1 over the visible spectrum, and is only marginally better than the reflected beam contrast 255 given in FIG. 2a for an actual device. FIG. 3b shows a plot of the theoretical overall contrast ratio 275, where the overall contrast Cw of the wire grid polarization beamsplitter device is approximated as:

$$Cw=1/((1/C_T)+(1/C_R)) \qquad (3).$$

The overall contrast Cw, which combines the contrast $C_T$ of the transmitted light beam 150 ("p" polarization) with the contrast $C_R$ of the reflected light beam 140 ("s" polarization), can be seen to be mostly determined by the lowest contrast ratio, which is the contrast for the reflected light beam. Thus, the overall contrast of the prior art type device per U.S. Pat. No. 6,108,131 is limited by the "s" polarization reflected beam, and is only ~10:1 to ~100:1 within the visible spectrum, with the lowest performance for blue wavelengths.

Considering again FIG. 4, the preferred relationships of the wire grid devices within modulation optical system 300 will be discussed in greater detail. Modulation optical system 300, which is described in U.S. Pat. No. 6,585,378 (Kurtz et al), should be understood to generally be a portion of some larger electronic projection system, which includes a light source and power supply, drive electronics, and screen, although this modulation optical system may be used for other applications, such as image printing.

A full color projection system would employ one modulation optical system 300 per color (red, green, and blue), with the color beams reassembled through the recombination prism 380. The incoming illumination light beam 320 is focused through prepolarizer 330, wire grid polarization beamsplitter 340, optional compensator 360, and onto spatial light modulator 310 (the LCD) by a condensor 325. Spatial light modulator 310 is packaged within spatial light modulator assembly 315, which includes mounting features, a cover glass, and heat sink (all not shown). Condensor 325, which will likely comprise several lens elements, is part of a more extensive illumination system (not shown) which transforms the light from the lamp source into a rectangularly shaped region of nominally uniform light which nominally fills the active area of spatial light modulator 310. The modulated, image-bearing light beam reflected from the surface of spatial light modulator 310, is transmitted through compensator 360, is then reflected off the near surface of wire grid polarization beamsplitter 340, and is next transmitted through a second compensator 365 (optional), a polarization analyzer 370, and recombination prism 380. In a modulation optical system 300 utilizing a prior art wire grid polarization beamsplitter, the wire grid polarization beamsplitter 340 consists of a dielectric substrate 345 with sub-wavelength wires 350 located on one surface (the scale of the wires is greatly exaggerated in FIG. 4). Thereafter, the image bearing light is projected down optical axis 375 onto a distant screen (not shown) by projection lens system 385

(only partially shown). Wire grid polarization beamsplitter 340 is disposed for reflection into projection lens system 385, thereby avoiding the well known astigmatism and coma aberrations induced by transmission through a tilted plate.

Compensator 360 is nominally a waveplate which provides a small amount of retardance needed to compensate for geometrical imperfections and birefringence effects which originate at the surface of spatial light modulator 310. Although a compensator 360 will generally be used, some applications allowing high f# optics may not require it. Compensator 365, which is optional, provides contrast enhancements for polarization response errors from other components in the system. For example, in a three color projection system, compensator 365 could be a color tuned waveplate provided in any given channel to optimize the performance through the recombination prism 380. These compensators are used to boost the effective performance of the LCD and wire grid devices, so that the system contrast levels are met or exceeded.

The construction of modulation optical system 300, as used in a digital cinema application, is defined both by the system specifications and the limitations of the available wire grid polarizing devices. In particular digital cinema requires the electronic projector to provide high frame sequential contrast (1,000:1 or better). To accomplish this, the polarization optical components, excluding spatial light modulator 310 (the LCD) of modulation optical system 300 must provide an overall system contrast (Cs) of ~2,000:1. The actual target contrast for the polarization optics does depend on the performance of the LCDs. Thus, if for example, the LCDs provide only ~1500:1 contrast, then the polarization optics must provide 3,000:1 contrast. For example, an LCD with vertically aligned molecules is preferred for uses as spatial light modulator 310 due to its high innate contrast. Typically, the contrast performance of both the LCDs and the polarization optics decreases with increasing numerical aperture of the incident beam. Unfortunately, with today's technologies (see FIG. 3b and overall contrast ratio curve 275) it is not sufficient to use just a single wire grid polarization beamsplitter 340 by itself in order to meet the 2,000:1 target contrast for the polarization optics. For this reason, prepolarizer 330 and polarization analyzer 370 are both provided as polarization support components within modulation optical system 300.

As an example, in green light at 550 nm, wire grid prepolarizer 330 has an angle averaged polarization contrast ratio of ~250:1. When used in combination, wire grid polarization beamsplitter 340 and wire grid prepolarizer 330 produce a contrast ratio of ~25:1, which falls way short of the system requirements. Thus, the prepolarization performance of overall modulation optical system 300 is also supported with the addition of polarization analyzer 370 which is preferably a wire grid polarizer, and is nominally assumed to be identical to wire grid polarizer 330. Polarization analyzer 370 removes the leakage of light that is of other than the preferred polarization state. Thus, the overall system contrast Cs for green light, directed through modulation optical system 300 in its entirety, is boosted to ~2,900:1, which meets specification. Performance does vary considerably across the visible spectrum, with the same combination of wire grid polarizing devices providing ~3,400:1 contrast in the red spectrum, but only ~900:1 contrast in the blue. Certainly, this performance variation could be reduced with the use of color band tuned devices, if they were available.

The polarization performance of modulation optical system 300 is determined by the performance of the wire grid devices in both obvious and non-obvious ways. The overall contrast (Cs) for modulation optical system 300 (ignoring the LCD contribution) can be approximated by:

$$1/C_s = 1/(C_{T1}*C_{T2}) + 1/(C_{R2}*C_{T3}) \quad (4),$$

where $C_{T1}$ is the transmitted contrast of the pre-polarizer 330, $C_{T2}$ and $C_{R2}$ are transmitted and reflected contrast ratios for the wire grid polarization beamsplitter 340, and $C_{T3}$ is the transmitted contrast for the wire grid polarization analyzer 370. In this system, the overall contrast is largely determined by the low reflected contrast ratio $C_{R2}$ for the wire grid polarization beamsplitter 340. The analyzer contrast $C_{T3}$ needs to be quite high to compensate for the low $C_{R2}$ values (~30:1). Whereas the transmitted contrasts $C_{T1}$ and $C_{T2}$ don't need to be particularly high, provided the respective contrast values are reasonably uniform over the spectrum. Potentially these wire grid contrasts ($C_{T1}$ and $C_{T2}$) could be moderated (to ~100:1) each respectively, in order to boost the wire grid transmissions through each of these surfaces. Alternately, if the transmitted contrast $C_{T2}$ was boosted sufficiently (to ~4,000:1$^+$), then pre-polarizer 330 could be eliminated. However, the range of wire grid devices that are presently commercially available are insufficient to enable such optimizations of modulation optical system 300. Moreover, even if such devices were available, merely replacing the existing wire grid devices in modulation optical system 300 with better devices that are refinements of prior art technologies, would not necessarily address other problems associated with the use of these devices. In summary equation (4) demonstrates that the manner of combination of the various polarization devices can greatly effect the resultant overall contrast. It has also been shown that modulation optical system 300 is best constructed with wire grid polarization beamsplitter 340 oriented with the surface with the sub-wavelength wires 350 facing towards the spatial light modulator 310, rather than towards the illumination optics (condenser 325) and light source. While the overall contrast (Cs) is ~2,900:1 when this orientation is used, the net contrast drops precipitously to ~250:1 when the alternate orientation (wires on the surface towards the light source) is used.

Notably, this preferred orientation, with the sub-wavelength wires oriented towards the modulator, also helps to reduce the impact of thermal loading on the performance of modulation optical system 300. It is known that conventional electronic projection systems, using standard glass polarization prisms (MacNeille type), can suffer thermally induced stress birefringence effects which impact the image contrast. In these systems, the localized polarization states of the image bearing light are altered by thermally induced stress birefringence in the prisms which was caused by the heat from the high intensity illumination. Modulation optical system 300 of FIG. 4 reduces this problem by having the image bearing beam reflect off wire grid polarization beamsplitter 340, rather than be transmitted through it. With this configuration, light is transmitted through wire grid polarization beamsplitter 340 one time only, while the second interaction with the beamsplitter is only a surface interaction. Thermal stress birefringence and the resulting contrast loss is further reduced because wire grid polarization beamsplitter 340 simply uses less glass (~1.5 mm thick substrates) than does the conventional prism (30–50 mm thickness). Nonetheless, contrast loss from stress birefringence with the conventional wire grid polarization beamsplitters may still occur. Furthermore, a modulation optical system, such as the one of FIG. 4, with the image bearing light reflected off of the polarization beam splitter, is more sensitive to wavefront errors from thermally induced substrate deformations, than is the comparable system with the image bearing light transmitted through the polarization beam splitter.

From the prior discussion, it can be seen that prior art wire grid polarization beamsplitters, while superior to more conventional technologies, have various properties (thermal stress deformation, thermal stress birefringence, low reflected CR, low blue transmitted CR, orientational sensitivity, etc.) which cause the design of a high contrast modulation optical system to be less than optimal. Certainly, the performance and design of a modulation optical system would benefit by the existence of improved wire grid polarization beamsplitters. In particular, if the performance of the wire grid polarization beamsplitter 340 was enhanced, relative to thermal sensitivity, contrast, transmission, and wavelength response (particularly in the blue), modulation optical system 300 could be constructed with fewer components and higher net transmission.

Figure 5:
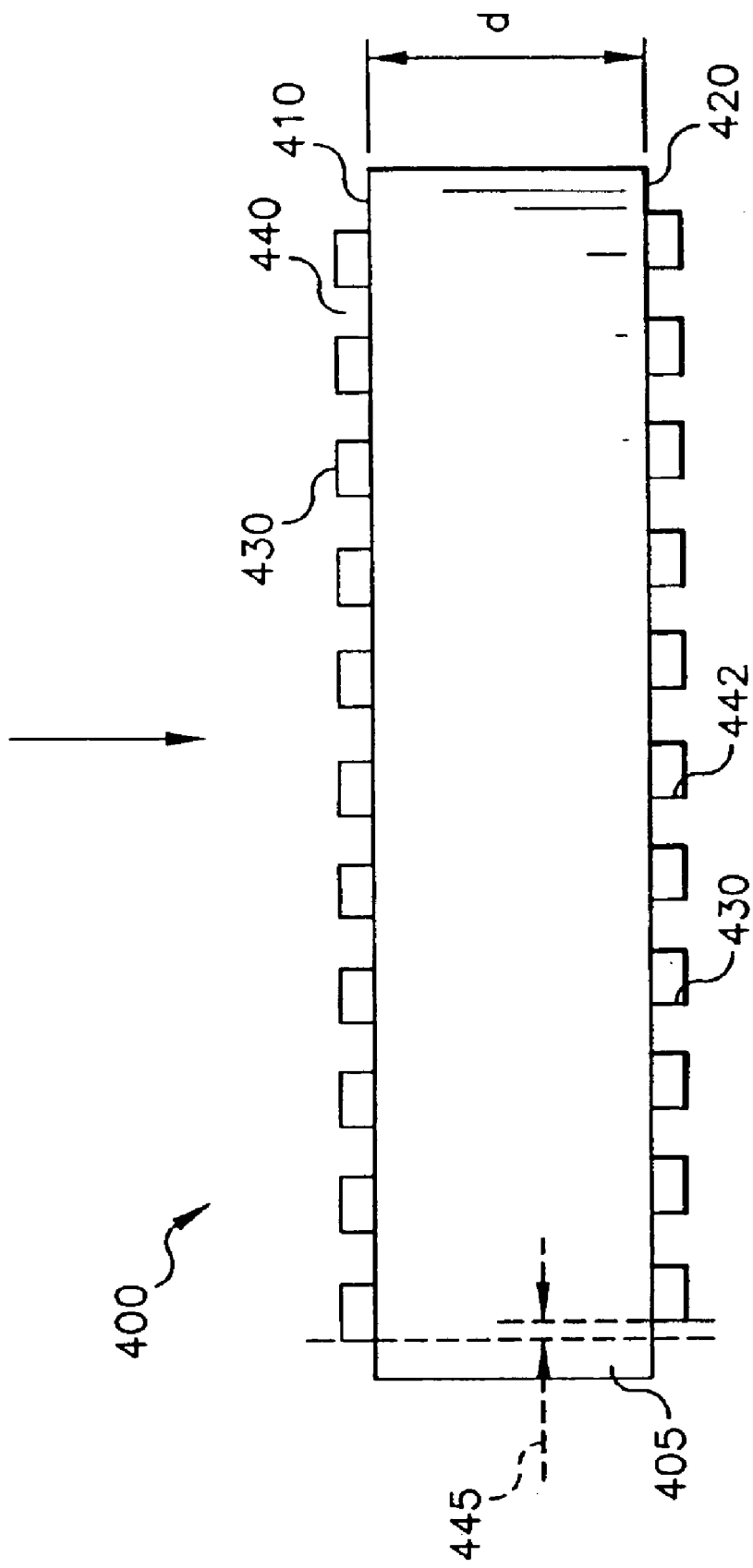
FIG. 5 is a detailed cross sectional view of the double sided wire grid polarizer of the present invention.

FIG. 5 illustrates the general concepts for a new double sided wire grid polarizer 400 according to the present invention. Most simply, double sided wire grid polarizer 400 consists of a dielectric substrate 405 (preferably glass) with a parallel pattern of sub-wavelength wires 430 and grooves 440 formed on a first surface 410 and a second parallel pattern of sub-wavelength wires 430 and grooves 442 formed on a second surface 420. As with the prior art devices, these sub-wavelength wires are conductive electrodes, which are likely made of a metal such as aluminum. First surface 410 is nominally parallel to second surface 420, while the pattern of the sub-wavelength wires 430 of the first surface 410 and the pattern of sub-wavelength wires 430 of second surface 420 are also nominally parallel to each other. However, the wire patterns on the two surfaces are not necessarily identical, and indeed, preferably are different in a controlled and deliberate fashion. It should be understood sub-wavelength wires depicted in FIG. 5 are greatly exaggerated in scale, in order to illustrate their general nature.

Certainly, other opportunities have been suggested for improving the performance of wire grid polarizers generally, and wire grid polarizers for the visible spectrum in particular. While U.S. Pat. No. 6,108,131 describes the basic structure and properties for visible wavelength wire grid polarizers, U.S. Pat. No. 6,122,103 proposes a variety of improvements to the basic wire grid structure. For example, U.S. Pat. No. 6,122,103 provides methods to broaden the wavelength spectrum and improve the efficiency and transmitted contrast across the wavelength spectrum of use without requiring finer pitch structures (such as ~$\lambda$/10). In particular, a variety of techniques are employed to reduce the effective refractive index (n) in the medium surrounding the wire grid, in order to shift the longest wavelength resonance band to shorter wavelengths. This is accomplished most simply by coating the glass substrate with a dielectric layer which functions as an anti-reflectional (AR) coating, and then fabricating the wire grid onto this intermediate dielectric layer. More recently, U.S. Pat. No. 6,243,199 describes how wire thickness, wire pitch, groove width, and wire shape, can be varied to optimize transmission and contrast of the transmitted polarized beam.

Alternately, U.S. Pat. No. 6,532,111 (Kurtz et al.) suggests an alternate design for a wire grid polarizer in which each wire is fabricated with an intra-wire sub-structure of alternating metal and dielectric layers (see FIG. 8c). Unlike the improvements suggested by U.S. Pat. Nos. 6,122,103 and 6,243,199 this application describes opportunities to potentially improve both the reflected beam contrast and the transmitted beam contrast, and thereby improve the combined overall contrast (Cw). As noted previously, in optimizing the design of wire grid polarizers generally, and wire grid polarization beamsplitters in particular (as used in a modulation optical system 300), the overall contrast is limited by the reflected beam contrast.

The double sided wire grid polarizer 400 of FIG. 5 is an improved wire grid device that not only has the potential to improve the overall polarization contrast, but also provides reduced sensitivity to thermal loading, particularly when it is used within an appropriate modulation optical system 300, (see FIG. 6a). As stated previously, double sided wire grid polarizer 400 consists of a dielectric substrate 405 with a parallel pattern of sub-wavelength wires 430 and grooves 440 formed on a first surface 410 and a second parallel pattern of sub-wavelength wires 430 and grooves 442 formed on a second surface 420, where the sub-wavelength wires are nominally metal conductive electrodes. First surface 410 is nominally parallel to second surface 420, while the pattern of the sub-wavelength wires 430 of the first surface 410 and the pattern of sub-wavelength wires 430 of second surface 420 are also nominally parallel to each other. It should be understood that each sub-wavelength wire (420 and 430) has a length that is generally larger than the wavelength of visible light (at least >0.7 $\mu$m), and that in actuality the wire lengths are several millimeters, or even centimeters in extent.

Double sided wire grid polarization beamsplitter 400 has a first important difference compared to the existing devices with metal wires deposited only on one side, which is that both surfaces will experience heating due to light absorption. As a result, the double sided wire grid polarization beamsplitter 400 will be heated more uniformly than the equivalent single sided device. Heating of this device under the large heat (light) loads required for high lumen projection applications can cause the device to deform, thereby affecting the transiting wavefronts and the projected on screen image quality. This is particularly true in a modulation optical system 300, as shown in FIG. 4, where the image bearing light beam 390 is reflected of the second surface of the wire grid polarization beam splitter 340. Alternately (see FIG. 6b), modulation optical system 300 could be configured for image bearing light beam 390 to transmit through the wire grid polarization beam splitter 340 on its way to the projection lens and screen, but the system would then suffer the added aberrations from transmission through a tilted plate. Alternately, the substrate 345 can be made from a low absorption glass such as fused silica or a low stress birefringent glass such as SF-57, but only at significant expense, and without providing the other advantages of the double sided structure. The typical construction of a wire grid polarizer also includes the use of a dielectric stack coating (an AR coating) on the side opposite that of the metal wire grid structure. The stress induced by this stack will typically vary differentially, both nominally and upon heating, as compared to the residual stress of the metallic grid coating. This uneven stress buildup, upon absorption and heating of the substrate will induce wavefront degradation. By comparison, as the double sided wire grid polarization beam splitter 400 will experience heating from light absorption within the metal wires on both sides, the device will be heated more uniformly, creating a more balanced surface stress, and thus will deform less, thereby affecting the transiting wavefronts less. Furthermore, this more uniform heating should also induce less thermal stress birefringence within the substrate 405, thus also enhancing the overall system contrast of the projected image.

The concept of a double sided wire grid polarization beam splitter 400 not only offers the potential for reduced thermal sensitivity, but also opportunities to design a better wire grid polarization beamsplitter and a better modulation optical system. This can be understood by considering the overall contrast (Cs) for modulation optical system 300 of FIG. 6a (as before, ignoring the LCD contribution), which can be approximated by:

$$1/Cs = 1/(C_{T1} * C_{T2}) + 1/(C_{R2} * C_{T3}) \quad (5)$$

where $C_{T1}$ is the transmitted contrast through the subwavelength wires 430 on the first surface 410 of double sided wire grid polarization beamsplitter 400, $C_{T2}$ is the transmitted contrast through the subwavelength wires 430 on the second surface 420 of double sided wire grid polarization beamsplitter 400, $C_{R2}$ is the reflected contrast off the subwavelength wires 430 on the second surface 420 of double sided wire grid polarization beamsplitter 400, and $C_{T3}$ is the transmitted contrast for the wire grid polarization analyzer 370. As with the prior system (FIG. 4), the overall contrast is largely determined by the low reflected contrast ratio $C_{R2}$ from the wire grid polarization beamsplitter. Likewise, as previously, the analyzer contrast $C_{T3}$ needs to be quite high to compensate for the potentially low $C_{R2}$ values. Thus, as before, the specifications for the transmitted contrasts $C_{T1}$ and $C_{T2}$ could be relaxed, thus potentially allowing the transmission values $T_1$ and $T_2$) to be enhanced for these two surfaces. Certainly, the functional dependencies of equations (4) and (5) are similar, relative to design adjustments to the constituent wire grid arrays which could alter contrast and transmission, thereby allowing optimization of system performance. However, the double sided wire grid polarization beam splitter provides other opportunities to both optimize device and system performance.

To begin with, pre-polarizer 330 of the prior modulation optical system 300 of FIG. 4, effectively becomes a grid of sub-wavelength wires 430 on the first surface 410 of the double sided wire grid polarization beamsplitter 400 of FIG. 6a. This provides the immediate advantage that modulation optical system 300 of FIG. 6a utilizes one less optical component, thus potentially enhancing the overall system light efficiency. Additionally however, use of the double sided structure effectively positions the "pre-polarizer" wire grid (of surface 410) at a nominal 45° tilt to the incident light beam. As shown in FIG. 7a, which plots both the transmitted ($C_{T1}$) and reflected ($C_{R1}$) theoretical contrast (205 and 210) vs. polar angle for the first surface wire grid (for green light (550 nm), and an exemplary structure (aluminum wires, wire grid pitch (p)=144 nm, duty cycle=45%, wire grid thickness (t)=144 nm)), the transmitted contrast gradually increases vs. polar angle. FIG. 7b shows the light efficiency in transmission ($T_{P1}$) and reflection ($R_{P1}$) for "p" light for this same structure with 144 nm thick wires. These graphs show that the first surface wire grid array of a double sided wire grid polarizing beamsplitter 400 oriented at 45°, transmits "p" light with a contrast of ~8,000:1 and a transmission efficiency of ~87%.

Figure 7E:
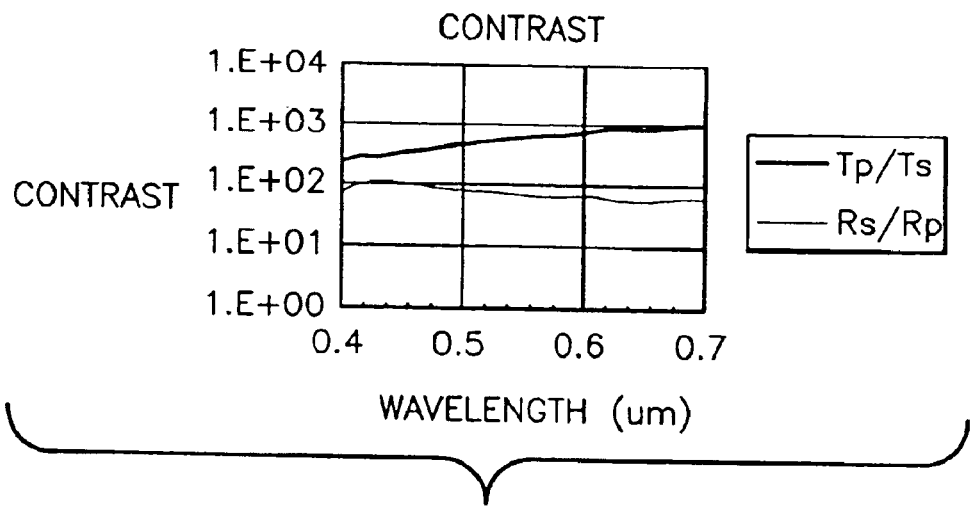
Figure 7F:
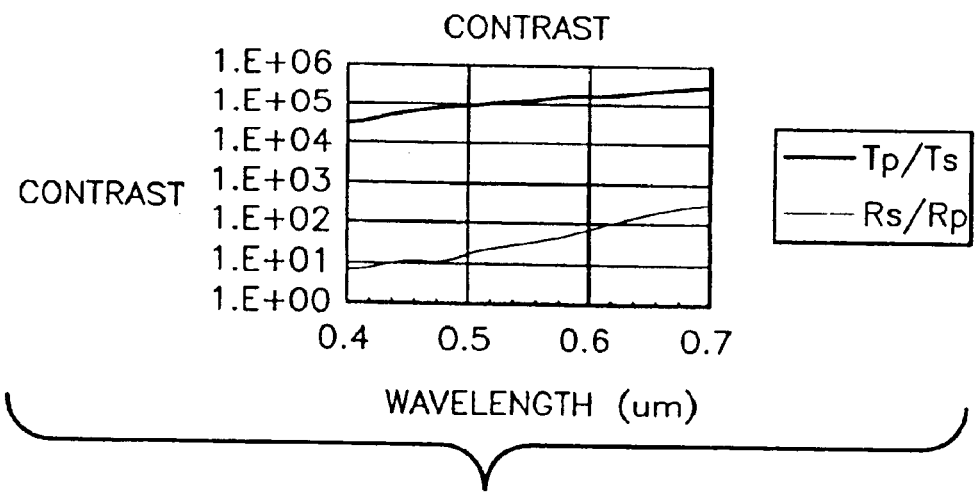
Figure 7G:
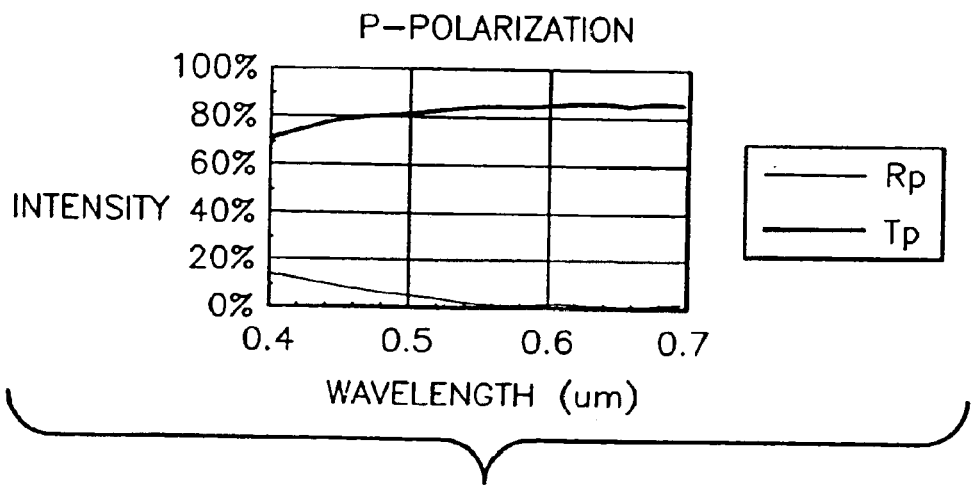

An alternate wire grid structure, identical to the first, but with 100 nm thick aluminum wires can be evaluated using FIGS. 7c and 7d, which plot contrast and efficiency vs. polar angle. In this case, the theoretical transmitted contrast ($C_{T1}$) for a 45° oriented wire grid array has fallen to ~800:1, while the transmission ($T_{P1}$) is slightly higher at ~91%. As shown in FIG. 7e, the wire grid array with the 100 nm thick wires also provides a nearly even reflected contrast $C_{R1}$ of ~75:1 vs. wavelength, although the transmitted contrast $C_{T1}$ still shows the blue fall off typical of most visible wire grid polarizers. While this 100 nm exemplary design has not quite provided an even ~100:1 reflected contrast across the entire visible spectrum, the performance is significantly improved over existing devices (~10:1 to 40:1 CR, as shown as curve 210 of FIG. 2a). Yet another alternate wire grid structure, identical to the first, but with 200 nm thick aluminum wires instead of 100 nm or 144 nm thick wires can be evaluated using FIGS. 7f and 7g, which plot the theoretical transmitted ($C_{T1}$) and reflected ($C_{R1}$) contrast ratios and light efficiencies ($T_{P1}$ and $R_{P1}$) vs. wavelength. These plots indicate that thicker wires theoretically increase the transmitted "p" contrast significantly ($C_{T1} > 20,000:1$), but at the cost of a significant drop in light efficiency ($T_{P1}$ averaging ~82%) particularly at short wavelengths.

Considered in their entirety, plots 7a–g suggest that a thin metal wire structure is best suited for the first surface 410 of double sided wire grid polarizer 400, where only a modest contrast ($C_{T1}$~100–200:1) is required, while higher transmission ($T_{P1}$) is valued. This suggests that an optimal broadband visible spectrum first surface wire grid, using simple wire grids with rectangular wires, may utilize metal wires <100 nm thick, and perhaps only 75–100 nm thick.

As shown in FIG. 6a, the "p" light transmitted through the wire grid structure of first surface 410 is further modified (contrast enhanced) by transmission through the second surface 420. Notably, the modeled contrasts $C_{T1}$ and $C_{T2}$ are essentially identical when the same structure is applied to both surfaces, although the first surface provides an air to glass transition, while the second surface provides a glass to air transition. In this example, transmitted light beam 150 passes through an optional compensator 360 and then encounters spatial light modulator 310, which is nominally a reflective LCD, which modifies the polarization state of the incident light on a pixel to pixel basis according to the applied control voltages. Intermediate code values, between white and black, reduce the amount of "On" state and increase the amount of "Off" state light. The "On" state light, which has been polarization rotated, is "s" polarization relative to the wire grid structure of second surface 420. In modulation optical system 300 of FIG. 6a, this "s" state light reflects off double sided wire grid polarization beamsplitter 400, is transmitted through an optional compensator 365 and polarization analyzer 370, and is subsequently directed to the screen by a projection lens (neither of which are shown). Considering again equation (5), the overall contrast $C_s$ depends on the reflected contrast $C_{R2}$ and the transmitted contrast $C_{T3}$ of polarization analyzer 370. Polarization analyzer 370, which is preferentially a wire grid polarizer, is oriented so that the "On" state light, which had "s" polarization relative to the double sided wire grid polarization beamsplitter 400, sees this same light as "p" state light relative to its' own structure. Polarization analyzer 370 therefore removes any alternate polarization leakage light accompanying the desired "On" state beam.

As the final image contrast depends critically on the values $C_{R2}$ and $C_{T3}$, optimization of the second surface wire grid polarizer significantly impacts the overall result. As shown in FIG. 7a, the reflected contrast (Rs/Rp) in the green for the 144 nm thick wire structure peaks (~2,000:1) near ~35° tilt, and is still significantly boosted (~100:1) at 45° tilt, as compared to normal incidence (~20:1). This type of broad angular response can be important for fast optical systems (f/2.5 for example). Unfortunately, the model of this device with 144 nm thick wires shows a very significant variation of reflected contrast (Rs/Rp) vs. wavelength, with a dramatic fall-off in the blue spectrum. This compares unfavorably with model for the similar device with 100 nm thick wires, which has the relatively even reflected contrast response (Rs/Rp) of FIG. 7e.

In general, reflected contrast (Rs/Rp), unlike transmitted contrast (Tp/Ts), is hard to control and optimize, particularly when the transmitted light efficiency $T_P$ must also be maximized. Certainly, going to significantly shorter pitch (p~$\lambda$/10, for example) would boost the reflected contrast. Likewise, more complex metal wire structures (tapered wires, rounded wires, stratified wires, etc . . . ; see FIGS. 8a–d) with current wire pitches (p~$\lambda$/4) can be used to various beneficial effects, as compared to the basic rectangular wires. The modeling suggests that the wire grid array with basic rectangular profile wires can be optimized for both contrast (Rs/Rp ~100:1 average) and transmission (Tp) by using wires ~95–115 nm thick. Alternately, these devices could be optimized separately for each color channel, R, G, B for use in an electronic projection system. In that case, the modeling suggests that wire thickness used on the second surface 420 of double sided wire grid polarizing beamsplitter 400 for the green and red channels may be significantly thicker than would be the case for the blue channel. For example, the device modeled with 144 nm thick wires has ~500:1 average reflected contrast Rs/Rp across much of the green and red spectra, while the transmission Tp remains quite high (FIG. 7d).

If the reflected contrast Rs/Rp could be boosted sufficiently (>500:1, or 2,000:1 for example) for the specified system, then polarization analyzer 370 could potentially be eliminated. Alternately, polarization analyzer 370 can have an increased polarization extinction to compensate for the sub-optimal $C_{R2}$ performance of the wire grid on the second surface 420 of double sided wire grid polarization beam splitter 400. However, assuming contrast $C_{R2}$ is only moderately high (~50–100:1) on average, polarization analyzer 370 could also be optimized with moderate contrast (~100–400:1) and maximized transmission (>90%). Thus, the wire grid structures provided for first surface 410 and second surface 420 of double sided wire grid polarization beam splitter 400 may not be identical. Indeed, the wire pitch (p), wire width (w), wire thickness (t) and the wire profile or structure may not be identical from one side to the other.

The final image quality, relative to contrast, also depends on the rejection of the second reflection leakage light. Again considering FIG. 6, the "Off" state light returning from the spatial light modulator 310, is transmitted through second surface 420 and first surface 410 of double sided wire grid polarization beam splitter 400. The "Off" state light at second surface 420 is affected by the wire grid structure on that surface such that most of this light is transmitted through, while the reflected light (Rp) becomes the leakage light which is subsequently further reduced by polarization analyzer 370. Most of the transmitted "p" polarized light is likewise efficiently transmitted through the wire grid structure on the first surface 410, and thereby is safely removed from the imaging system. There is however a reflection of the first surface 410, which is directed towards the imaging system, and which could create a defocused ghost image. However, this ghost beam, which has a reduced light level compared to the "Off" state leakage light reflected into the imaging path at second surface 420, is likewise removed by polarization analyzer 370.

The double sided wire grid polarization beam splitter of the present invention is notably different than the device described in U.S. Pat. No. 4,289,381 (Garvin), which also describes a wire grid polarizer with a wire grid structure utilizing two parallel metal wire grid arrays. In particular, the present device is structurally different than the device of U.S. Pat. No. 4,289,381, as that prior art device places both parallel wire grid arrays on a first surface, rather than separately on a first and second surfaces respectively. Thus the prior art U.S. Pat. No. 4,289,381 device doesn't provide the nominally equalized thermal loading of both surfaces as does the device of the present invention. Additionally, U.S. Pat. No. 4,289,381 specifies a device which is strictly a very high contrast polarizer, in which contrast is maximized (250,000:1) target, while light transmission efficiency may be sacrificed. By comparison, the device of the present invention, seeks to optimize both the contrast and light efficiencies to seek an overall effect, with high contrast (500:1–4,000:1 CR) and high combined transmitted light efficiency (>80%). Finally, the wire grid polarizing device of the present invention, with two parallel wire grid structures residing on two separated surfaces, is primarily intended for use as a wire grid polarization beam splitter, rather than as a normal incidence optimized polarizer. Therefore, the device of the present invention, unlike that of U.S. Pat. No. 4,289,381, is designed to optimize both the transmitted beam contrast (Tp/Ts) and the reflected beam contrast (Rp/Rs), because both contribute to the overall performance of an overall modulation optical system.

Figure 8A:
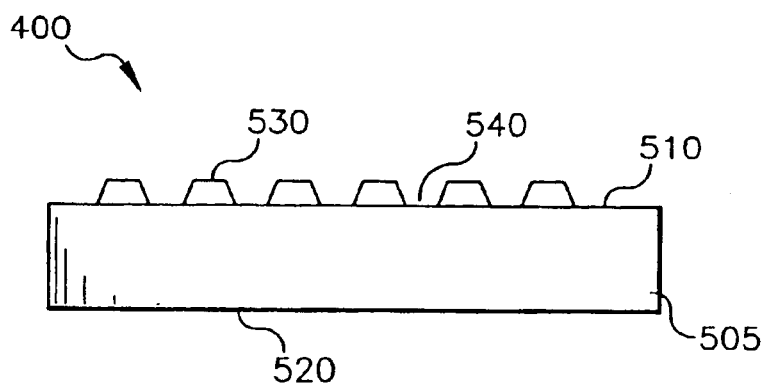
FIGS. 8a–8d are cross sectional views of various wire structures which could be employed in the wire grid polarizer of the present invention.
Figure 8B:
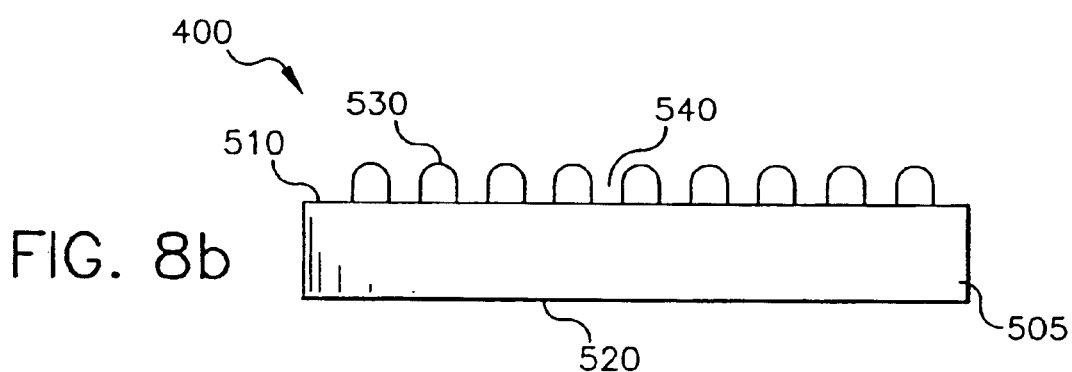

While this double sided wire grid polarization beam splitter has been described both as a discrete device, and as a component within a larger modulation optical system, it should be understood that there are variations which fall within the scope and context of the present invention. For example, the metal wires which comprise the individual wire grid structures can be constructed using a variety of other structures beyond the basic rectangular wire profile. For example, as shown in FIG. 8a, the sub-wavelength wires 530 could have a tapered structure 532, which slopes into grooves 540. Tapering is an additional design control parameter, similar to selecting the wire pitch (p), the wire to groove (540) duty cycle, and the wire thickness (t), by which the contrast, light efficiency, and wavelength performance of a wire grid array can be optimized. Likewise, as shown in FIG. 8b, the sub-wavelength wires 530 could have a rounded structure 534. It should be understood that in either case, using tapered or rounded profile wires, wire grid arrays would be formed on both the first surface 510 and the second surface 520 of substrate 505, to create a double sided wire grid polarization beamsplitter 400. The second side wire grid structures are not shown on FIGS. 8a–d for simplicity of illustration.

Figure 8C:
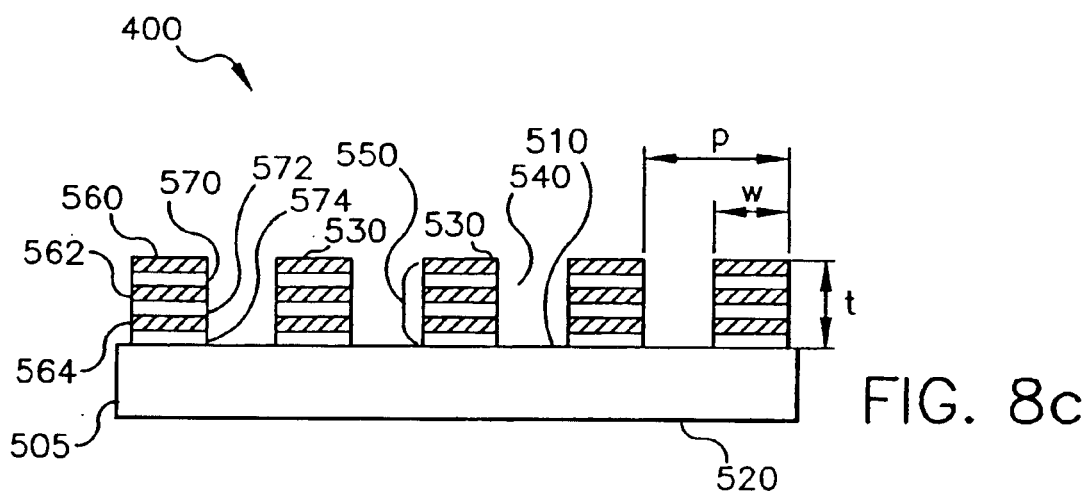

Similarly, FIG. 8c shows an alternate composite wire grid structure, in which the sub-wavelength wires 530 are constructed with intra-wire substructures 550 comprising alternating metal layers (560, 562, and 564) and dielectric layers (570, 572, and 574). This device employs resonance enhanced tunneling through the metal layers, by means of interaction with the intervening dielectric layers, to enhance transmission of the "p" polarized light and reflection of the "s" polarized light. The design and performance of wire grid polarizers utilizing this type of intra-wire substructure are described in greater detail in U.S. Pat. No. 6,532,111, which is incorporated herein by reference.

Figure 8D:
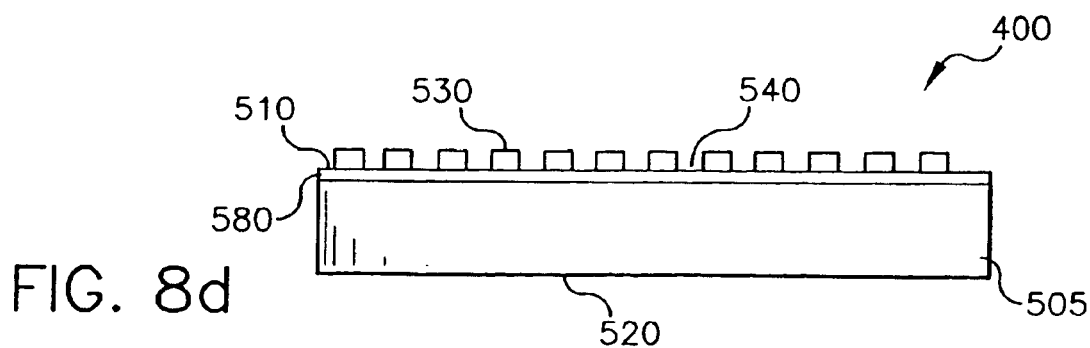

FIG. 8d shows yet another alternate wire grid structure in which the metallic sub-wavelength wires 530 are formed on an intermediate dielectric layer 580, which is in turn in contact with substrate 505. The wire structures of FIGS. 8c and 8d expand the design parameters much further, beyond just control of wire pitch (p), wire width (w), wire thickness (t), wire profile (tapered, rounded, etc . . . ), to enable dramatically enhanced performance. In particular, the reflected contrast Rs/Rp, the contrast performance vs. wavelength (particularly in the blue spectrum) and vs. angle can be enhanced by using these more complicated wire structures of FIGS. 8c and 8d. In the case of the double sided wire grid polarizer, use of these complicated alternate wire structures particularly suggest further opportunities to improve the reflected contrast $C_{R2}$ for the wire grid structure on second surface 420. Likewise, use of these complex structures could allow the wire grid structure on the first surface 410 to be designed to assist the suppression of the ghost leakage light which returned to the that surface from the LCD.

The double sided wire grid polarization beamsplitter of the present invention can be fabricated by forming a wire grid array on the first surface, flipping the device over, and forming a wire grid array on the second surface while protecting the first surface. Alternately, the device could be formed by assembling a double sided wire grid polarizing beamsplitter by combining two single side devices together with an optical adhesive, liquid, or gel. In some respects, the manufacturing process for the double sided structure need not be demanding. The relative parallelity of the two wire grid arrays, one to the other should be maintained, with minimal angular misalignment, in order to optimize transmission. Obviously, in the extreme of mis-alignment, as crossed polarizers, effectively no light would be transmitted. However, the tolerance of this angular alignment is fairly loose, with ~0.5° mis-alignment being tolerable. In the case that the two wire grid arrays of the two respective surfaces have the identical pitch (p), it is not necessary that the two grids are co-aligned with a tightly minimized grid offset 445 (see FIG. 5). The sub-wavelength wires, or conductive electrodes, are nominally metallic, so as to utilize the very high electrical conductivity of such materials. It is also beneficial to chose metals that have high optical efficiencies (reflectivities) in the chosen (visible) wavelength band. Therefore, metals such as aluminum, silver, chrome, or nickel, may be used. Presumably conductive electrodes could be formed of other materials, such as ITO (indium tin oxide), but only if both the electrical conductivity and the optical efficiency were high enough to provide the desired effects.

Preferably, the thickness (d) of substrate 405 needs to be sufficient (>200–500 nm depending on the structure) to avoid resonance enhanced tunneling effects between the two grid arrays. Otherwise, with resonance enhanced tunneling, the two wire grid arrays would effectively act as one device, rather than two parallel devices, and the performance would be greatly changed. In practice, the substrate thickness will likely be in the 0.5–3.0 mm range. Alternately, the double sided wire grid polarizer could be constructed with a thin (<0.15 mm) substrate, with the wire grids of the two surfaces deliberately co-aligned, in an attempt to deliberately utilize resonance enhanced tunneling through the metal wires (as in FIG. 8c), according to the concepts described in U.S. Pat. No. 6,532,111. While such a device could still benefit by the expected more uniform heating of both sides, as the substrate thickness would be minimal, device fabrication would likely be extremely difficult.

It should also be understood that the double sided wire grid polarization beamsplitter of the present invention could be utilized with the imaging light being transmitted through the device, as shown in FIG. 6b, rather than reflected off of it as depicted in FIG. 6a. Likewise, it should be understood that the double sided wire grid polarization beamsplitter could be used with a pre-polarizer instead of an analyzer, or by itself, without either pre-polarizer or polarization analyzer.

The invention has been described in detail with particular reference to certain preferred embodiments thereof, but it will be understood that variations and modifications can be effected within the scope of the invention.

PARTS LIST

100. Wire grid polarizer
110. Parallel conductive electrodes
120. Dielectric substrate
130. Beam of light
132. Light source
140. Reflected light beam
150. Transmitted light beam
200. Transmission efficiency curve
205. Transmitted contrast ratio curve
210. Reflected contrast ratio curve
220. Transmission efficiency curve
225. Reflected contrast ratio curve
250. Transmitted beam contrast
255. Reflected beam contrast
275. Overall contrast ratio
300. Modulation optical system
310. Spatial light modulator
315. Modulator assembly
320. Illumination beam
325. Condensor
330. Pre-polarizer
340. Wire grid polarization beamsplitter
345. Substrate
350. Sub-wavelength wires
360. Compensator
365. Compensator
370. Polarization analyzer
375. Optical axis
380. Recombination prism
385. Projection lens system
390. Image bearing light beam
400. Double sided wire grid polarizer
405. Substrate
410. First surface
420. Second surface
430. Sub-wavelength wires
440. Grooves
442. Grooves
445. Offset
505. Substrate
510. First surface
520. Second surface
530. Sub-wavelength wires
532. Tapered structure
534. Rounded structure
540. Grooves
550. Intra-wire substructure
560. Metal layer
562. Metal layer
564. Metal layer
570. Dielectric layer
572. Dielectric layer
574. Dielectric layer
580. Intermediate dielectric layer

What is claimed is:

1. A wire grid polarizer for polarizing an incident light beam, comprising:

a substrate having a first surface and a second surface;

a first array of parallel, elongated electrically conductive wires disposed on said first surface, wherein each of said wires are spaced apart at a grid period less than a wavelength of said incident light;

a second array of parallel, elongated electrically conductive wires disposed on said second surface, and wherein said second array of wires are oriented parallel to said first array of wires; and wherein each of said wires are spaced apart at a grid period less than a wavelength of said incident light.

2. A wire grid polarization beamsplitter for polarizing an incident light beam, comprising:

a substrate having a first surface and a second surface;

a first array of parallel, elongated wires disposed on said first surface, wherein each of said wires are spaced apart at a grid period less than a wavelength of said incident light;

a second array of parallel, elongated wires disposed on said second surface, and wherein said second array of wires are oriented parallel to said first array of wires;

wherein each of said wires of said second array are spaced apart at a grid period less than a wavelength of said incident light;

wherein said wires of both said first and second arrays have high electrical conductivity; and wherein designs of first and second arrays are optimized differently to provide different polarization based responses relative to performance attributes, including contrast and light efficiency.

3. A wire grid polarization beamsplitter for polarizing an incident light beam as in claim 2 which has a design for said first and second arrays that is optimized for a portion of the light spectrum, including one or more colors of red, green, or blue, respectively.

4. A modulation optical system for providing high contrast modulation of an incident light beam comprising:

(a) a prepolarizer for pre-polarizing said beam of light to provide a polarized beam of light;

(b) a wire grid polarization beamsplitter for receiving said polarized beam of light, for transmitting said polarized beam of light having a first polarization, and for reflecting said polarized beam of light having a second polarization orthogonal to said first polarization wherein one of said polarized beams of light is then incident onto a reflective spatial light modulator;

(c) wherein said reflective spatial light modulator receives said polarized beam of light, having either a first polarization or a second polarization, and selectively modulates said polarized beam of light to encode data thereon, providing both modulated light and unmodulated light which differ in polarization;

(d) wherein said reflective spatial light modulator reflects back both said modulated light and said unmodulated light to said wire grid polarization beamsplitter;

(e) wherein said wire grid polarization beamsplitter separates said modulated light from said unmodulated light;

(f) a polarization analyzer receives said modulated light, and which further removes any residual unmodulated light from said modulated light; and (g) wherein said wire grid polarization beamsplitter is a double sided wire grid polarization beamsplitter comprising a substrate having both a first surface and a second surface;

(i) a first array of parallel, elongated wires are disposed on said first surface;

(ii) a second array of parallel, elongated wires are disposed on said second surface, where said second array of wires are oriented parallel to said first array of wires;

(iii) wherein each of said wires of said arrays have a high electrical conductivity and are spaced apart at a grid period less than a wavelength of said incident light; and (iv) wherein designs of first and second arrays are optimized differently to provide different polarization based responses relative to performance attributes, including contrast and light efficiency.

5. A modulation optical system as in claim 4 wherein said reflective spatial light modulator receives said polarized beam of light having a first polarization state transmitted through said wire grid polarization beamsplitter.

6. A modulation optical system as in claim 4 wherein said reflective spatial light modulator receives said polarized beam of light having a second polarization state reflected from said wire grid polarization beamsplitter.

7. A modulation optical system as in claim 4 wherein either or both of said pre-polarizer and said polarization analyzer are a wire grid polarizer.

8. A modulation optical system in accordance with claim 7 wherein a compensator is provided to enhance the polarization contrast response of the spatial light modulator and/or other polarization components.

9. A modulation optical system for providing modulation of an incident light beam, comprising:

(a) a double sided wire grid polarization beam splitter with a substrate having both a first surface and a second surface;

(i) a first array of parallel, elongated wires are disposed on said first surface; and (ii) a second array of parallel, elongated wires are disposed on said second surface where said second array of wires are oriented parallel to said first array of wires;

(1) wherein each of said wires of said arrays have a high electrical conductivity and are spaced apart at a grid period less than a wavelength of said incident light; and (2) wherein the designs of first and second arrays are optimized differently to provide different polarization based responses relative to performance attributes, including contrast and light efficiency;

wherein said double sided wire grid polarization beam splitter transmits a first polarization state of said incident light beam and reflects a second polarization state of said incident light beam wherein said second polarization state is orthogonal to said first polarization state;

(c) a reflective spatial light modulator having a plurality of individual elements which alter said predetermined polarization state of said transmitted polarized light beam to provide said image bearing beam that then reflects back to said double sided wire grid polarization beamsplitter, said image bearing beam then reflecting off of said double sided wire grid polarization beamsplitter; and (d) a polarization analyzer which transmits said image bearing light beam and attenuates unwanted polarization components accompanying said image bearing light beam.

10. A modulation optical system in accordance with claim 9 wherein said spatial light modulator is a liquid crystal display (LCD).

11. A modulation optical system in accordance with claim 9 wherein said double sided wire grid polarization beam splitter has a design for said first and second arrays that is optimized for a portion of the visible color spectrum.

12. A modulation optical system in accordance with claim 9 wherein said double side wire grid polarization beamsplitter is heated from both sides of said substrate, thereby reducing stress induced birefringence within said double side wire grid polarization beamsplitter.

13. A modulation optical system in accordance with claim 9 wherein a compensator is provided to enhance the polarization contrast response of the spatial light modulator and/or other polarization components.

* * * * *